April 13, 1926.
R. GUBIN
1,580,196
METHOD AND APPARATUS FOR MANUFACTURING IMITATION
METALLIC AND COLORING FOIL FILMS
Filed May 21, 1925
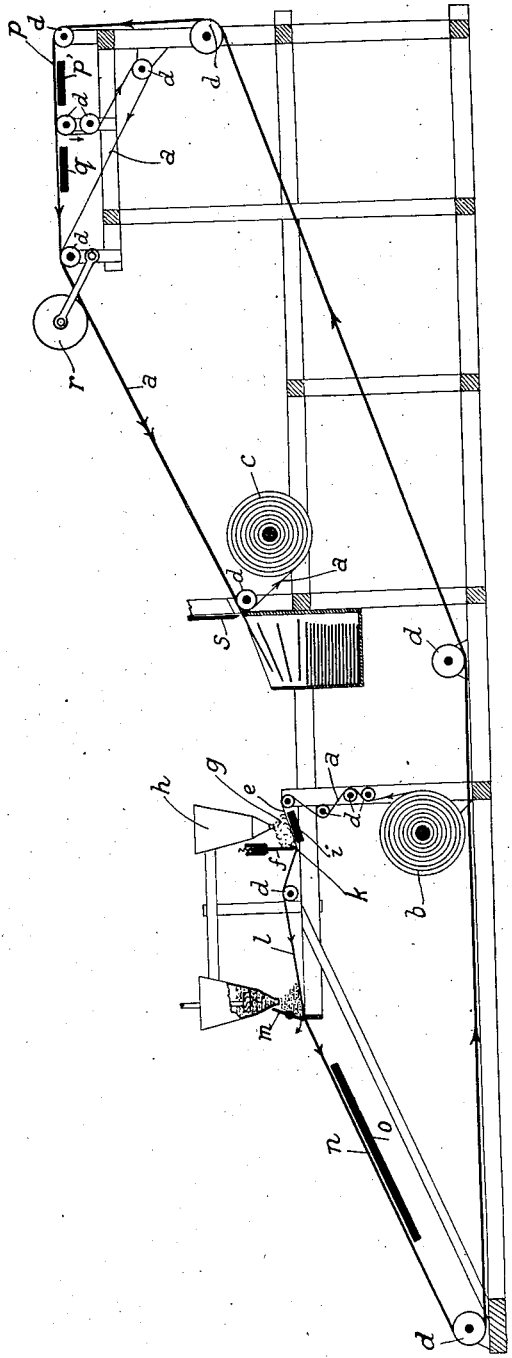

Patented Apr. 13, 1926.

1,580,196

UNITED STATES PATENT OFFICE.

RICHARD GUBIN, OF VIENNA, AUSTRIA.

METHOD AND APPARATUS FOR MANUFACTURING IMITATION METALLIC AND COLORING FOIL FILMS.

Application filed May 21, 1925. Serial No. 31,887.

*To all whom it may concern:*

Be it known that I, RICHARD GUBIN, a citizen of the Republic of Austria, and a resident of 15 Grunberggasse, Vienna, XII, Austria, have invented new and useful Improvements in a Method and Apparatus for Manufacturing Imitation Metallic and Coloring Foil Films, of which the following is a specification.

This invention relates to the manufacturing of filmlike continuous bronze or color-powder foils or leafs especially for stamping purposes and has for its object to provide a process and an apparatus, by means of which such films can be made automatically and in best quality and quite ready for stamping.

Hitherto such films have been made from solutions of filmforming matter. This way requires a hard film support of greatest smoothness, highly skilled workmen, a preparation of the surface of the film support and a treatment of the film for stripping it from the support. The films made from solutions are not equal in the thickness, have high moisture, are therefore too tough, and have either no reliable size-layer or no reliable connection of this layer with the bronze or foil-layer.

These inconveniences are removed by my improved method in which I employ in molten condition the substances coating the moving film support. This coating forms a bearing-layer for the foil-film and may be of wax, resin or fusible gum in composition with small quantities of oil or grease and asphalt. In this way it is possible to bring the molten coating, when stiffened, always again in molten or soft condition and to effect a firm connection of this layer with the coloring or foil matter laid on this bearing layer and forming the foil-film; further the molten matter permits the formation of a layer of equal thickness upon a support of any material, for example paper; the asphalt in the bearing-layer preventing the entrance of the layer-substance into the surface of the support.

The remelting and the added oil in the bearing-layer substance assures also the easy stripping of the film from the support, as the oil effects in soft condition of the layer a separation of this layer from the surface of the support, specially, if the support is of paper or the like.

Finally this bearing-layer (after being separated from the support) can be heated for removing the rest of the moisture, without danger of disintegrating, because formed in molten condition.

The heating of the bearing-layer takes place by covered heating device situated below the film-supporting band of paper and effecting through the moving band: first, to keep the molten substances in molten condition during the forming of the bearing-layer, second, remelting the stiffened bearing-layer for intense connection of this layer with the next film-layer and third, to separate the film from the support-band. The last heating device directly facilitates the separation of the film strip from the support band.

In the annexed drawing an example of an apparatus for carrying out the method according to the invention is shown in diagrammatically partly in elevation and partly in vertical section.

The manufacturing of the foil-film takes place on this apparatus as follows:

The support or band of paper $a$ wound up the roller $b$ and round the driven roller $c$ and guided by rolls $d$ is provided on the portion $e$ thereof with molten resin mixture from the crucible or container $h$, the molten condition of the mixture being maintained by heating devices $i$. The band $a$, set in motion, passes a spreading device $f$, the lower edge of which is spaced slightly as at $k$ above the surface of the band and may be invertically adjusted to cause a thin layer of the molten mixture to be deposited on the surface of the band $a$. This film or layer stiffens at once after passing said member $f$ and is coated on the portion $l$ with the coloring or other foil matter consisting of a color of the band $a$ or bronze powder in mixture with a solution of varnish, that is to say Cellit or Zapon or gum, approximately 100 parts of powder to 60 parts of varnish, this matter being deposited in a fine layer by an oblique spreading device $m$ movably mounted on a horizontal axle.

After passing this spreading device $m$ and on the portion *n* of the band *a*, when the new coat is dried, the first layer is remolten by a heating device *o*. In this way I effect a firm connection of both layers and form a film of uniform thickness. Thus the upper part of my film consists of coloring matter or bronze whereas the lower part thereof is resinous.

After passing over the heater *o* the film stiffens again and then it becomes separated from the band surface by a heating device *p'*, mounted below the portion *p* of the paper band *a*. The film is stripped from the band and guided without the band *a* way, on which it becomes directly heated by heating device *q*, after which it becomes again united to the band *a* and moved with it by aid of a swinging mounted roller *r*, which presses the film on the band, guiding it to the cutting device *s*, while the band is winding round the roller *c*. The cutting device causes the film to drop in superposed strips into a suitable holder as shown.

The method may be also carried out on a endless band.

Having now described my invention, what I claim is:

1. The method for the manufacture of imitation metallic and coloring foil films by applying the film matter to a moved support comprising sized fabric or sized backing or supporting band, the first layer of the film being applied to the support in a molten state.

2. The herein described method of manufacturing imitation metallic and coloring foil films consisting in applying a bearing layer of film on a supporting band, permitting said bearing layer to stiffen, applying a layer of coloring matter on said heated bearing layer, reheating said bearing layer and separating said foil film from said supporting band.

3. The method of manufacturing imitation metallic and coloring foil films consisting in applying a bearing film of adhesive fusible matter while in a molten state on a supporting band, causing said bearing film to stiffen, applying a layer of coloring matter on said bearing layer, and reheating said bearing layer after said coloring layer has been applied thereto.

4. In a method for manufacturing imitation metallic or coloring foil-films the forming in molten condition of a bearing-layer, the coating of this layer with imitation metallic or coloring matter after stiffening of the bearing layer and remelting by heating the bearing layer for firm connecting of this layer with the coating matter.

5. In a method for manufacturing imitation metallic or coloring foil-films the forming in molten condition on a moving film support of paper a bearing-layer of adhesive material, coating this layer with a composition of imitation metallic or color matter with a solution of varnish after stiffening of the first layer, heating the last for intensive connecting of this with the second layer, stiffening again and heating again the lower surface of the support and bearing-layer for separating the film from the support.

6. In a method for manufacturing imitation metallic and coloring foil-films the forming in molten condition on a moving film support a bearing-layer of fusible material, coating this layer with imitation metallic or color matter in composition, drying, remelting, stiffening, and reheating the layers, stripping the film from the support and heating the separated film.

7. In a method for manufacturing imitation metallic or coloring foil-films forming in molten condition on a moving support a bearing-layer, coating this layer after stiffening with imitation metallic or coloring matter in composition, drying this matter, remelting the bearing-layer, stiffening, then reheating the below surface for separating the film from the support, stripping the film from the support, heating the separated film, uniting again the film with the support and guiding both to a cutting device.

8. In apparatus for manufacturing imitation metallic or coloring foil films, a band of paper, means to move said band continuously, containers above the band for applying the film forming matters to the band, bars directed against the upper surface of the band to stow the matters forming the film, and heating devices arranged underneath the band at suitable points.

9. In apparatus for manufacturing imitation metallic or coloring foil films, a band of paper, means to move said band continuously, a container for applying the molten material to the band, a vertical bar adjustable in height, placed behind this container near to the surface of the band and a heating device underneath the band to maintain the molten material in front of the bar in molten state.

10. In apparatus for manufacturing imitation metallic or coloring foil films, a band of paper, means to move said band continuously, a container for applying the molten material to the band, a vertical bar adjustable in height, placed behind this container near to the surface of the band, a second container for applying the bronze or coloring mixture to the band, a bar behind this second container, set obliquely to the band, and being rockable about a horizontal axis, and a heating device arranged under the band and behind the bar for drying the applied layer of bronze mixing.

11. In apparatus for manufacturing imitation metallic or coloring foil films, a band of paper, means to move said band continuously, containers above the band for applying the film forming matters to the band, bars directed against the upper surface of the band to stow the matters forming the film, and heating devices arranged underneath the band at suitable points, means for separating the film from the band, heating device arranged underneath the separated film, and means to guide the film again united with the band to a cutting device.

In testimony whereof I affix my signature.

RICHARD GUBIN.